United States Patent
Subramanian et al.

(10) Patent No.: US 7,970,114 B2
(45) Date of Patent: Jun. 28, 2011

(54) CONSISTENCY OF STATE MODEL VISUALIZATION ACROSS DIFFERENT STANDARD ATTRIBUTES

(75) Inventors: Sriram Subramanian, Bangalore (IN); Rajasekar Venkatesan, Saratoga, CA (US); Christopher C. Liou, Cupertino, CA (US); Anthony W. Jorgenson, Fremont, CA (US); How Tung Lim, San Jose, CA (US); Sharfuddin Syed, Cupertino, CA (US); Daniel P. Murphy, Ben Lomond, CA (US); Steven Joseph Hand, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 1341 days.

(21) Appl. No.: 11/426,515

(22) Filed: Jun. 26, 2006

(65) Prior Publication Data
US 2007/0100887 A1    May 3, 2007

Related U.S. Application Data

(60) Provisional application No. 60/695,468, filed on Jun. 30, 2005.

(51) Int. Cl.
*H04M 3/00*    (2006.01)
(52) U.S. Cl. ......................................... 379/188; 379/194
(58) Field of Classification Search .................. 379/188, 379/32.01, 194; 395/200.53; 709/223, 224
See application file for complete search history.

(56) References Cited

U.S. PATENT DOCUMENTS

| | | | |
|---|---|---|---|
| 6,112,015 A | 8/2000 | Planas et al. | |
| 6,349,306 B1 | 2/2002 | Malik et al. | |
| 6,470,073 B1 * | 10/2002 | Fish et al. | 379/32.01 |

OTHER PUBLICATIONS

Jong-Tae Park et al., "Web-Based Customer Network Management", Enterprise Networking Mini-Conference, 1997, ENM-97 in Conjunction with ICC-97, Montreal, Que., Canada, pp. 160-169, Jun. 11-12, 1997.
Wolfgang Emmerich, "An Introduction to OMG/CORBA", Proceedings of the 1997 International Conference on Software Engineering, pp. 641-642, Boston, MA May 17, 1997.
Wilson et al., "Multiwavelength Optical Networking Management and Control", Journal of Lightwave Technology, vol. 18(12), pp. 2038-2057, Dec. 2000.

* cited by examiner

*Primary Examiner* — Thjuan K Addy
(74) *Attorney, Agent, or Firm* — W. Douglas Carothers; David L. Soltz

(57) ABSTRACT

A system, apparatus and method are described for displaying multiple attributes relative to objects in a network management program. In one embodiment, multiple attributes from a plurality of different standards are coalesced together and the coalesced attributes are displayed by a user interface. These coalesced attributes may be shown in such a manner so that inconsistencies between attributes of objects from different standards are reduced or obviated.

16 Claims, 7 Drawing Sheets

Administrative State 400

CONSISTENCY OF STATE MODEL VISUALIZATION ACROSS DIFFERENT STANDARD ATTRIBUTES

CROSS REFERENCE TO RELATED PATENT APPLICATIONS

This application claims priority to U.S. Provisional Application Ser. No. 60/695,468, entitled "Consistency in State Model Among Attributes of a Plurality of Objects Across Different Standards in the Display of Various States," filed Jun. 30, 2005, which application is incorporated herein by reference in its entirety.

BACKGROUND

A. Technical Field

The present invention relates generally to the state management of network elements, and more particularly, to the display of various attributes relative to various objects in computer software programs running on various network elements.

B. Background of the Invention

In a telecommunication or data communication network system, network elements ("NE") are connected to allow for the communication of information or messages within a network. Each NE typically has various objects that may have different states. Many of the systems and network elements therein, are supplied by multiple vendors that may have different management structures and user interfaces. These differences across the vendors oftentimes result in inconsistency and problem in accessing management information.

In the development of these management structures and user interfaces, vendors usually consider multiple standards in building their products. However, there may be variances across these standards relating to certain states of a NE resulting in a state having multiple different standards. These different states are caused by the fact that a graphical application or text-based application, such as TL-1, generally follows its own set of standard and own set of states.

Because each standard defines and recommends its own set of state attributes, it is required to provide state modeling of an object. The objective of state modeling is to provide users with complete information about the state of a system and the contained managed objects. For example, a user may require information relating to management of an object, or information relating to the inherent capability of providing service completely or partially relative to the object.

The simplest approach would be to model every attribute as required by every standard and let the user interface choose the appropriate attributes for display. FIG. 1 shows two different standards, Standard 1 101 and Standard 2 102, each having different attributes. Standard 1 101 has A1 101.1, A2 101.2, and A3 101.3 attributes while Standard 2 102 has A11 102.1, A12 102.2, and A13 102.3 attributes. These attributes are individually modeled and provided to the user interface.

Standard 1 101 has model 103 M1, M2, M3, for attributes A1 101.1, A2 101.2, and A3 101.3 respectively. Similarly, Standard 2 has model 104 M11, M12, M13, for attributes A11 102.1, A12 102.2, and A13 102.3 respectively. The required models 103, 104 are then selected by a user through an interface 105 and displayed 106. Though this approach is simple, each interface will need to maintain every kind of combination of standards and attributes resulting in a large number of attributes to any internal NE to support. This large number of attributes may require significant maintenance in a real-time environment that is fairly expensive in terms of information processing required in the software program.

The management structure and user interface may have inconsistencies between different state attributes. For example, if a state supports 5-6 different standards, then the corresponding management software may results in 20 to 30 attributes of each object in order to satisfy the various standards. As explained earlier, this approach is not practical in a real-time system since even a small change of state may require an update of the attributes. This updating process may need to be performed often requiring significant effort by a network administrator.

Accordingly, what is needed is a system, apparatus and method that addresses the above-described shortcomings.

SUMMARY OF THE INVENTION

A system, apparatus and method are described that provides a display of coalesced attributes of a plurality of objects across different standards in order to prevent inconsistencies between attributes of different or similar objects from multiple standards.

In one embodiment of the present invention, a method is disclosed that provides consistency in a state model among attributes of a plurality of objects across different standards in the display of various states. A plurality of different interface standards having multiple attributes is received and all attributes are analyzed individually. Attributes, which are common to various standards, are coalesced to form an internal state model. The coalesced attributes are displayed on the user's screen such that consistencies between attributes for different or similar objects from different standards are maintained.

In one embodiment of the present invention, the interface standards include TL-1, TMF 814 and ITU X.731 standards. The TL-1 standard includes multiple attributes including Primary State, Primary State Qualifier and Secondary State whereas TMF standard includes a Service State attribute. The ITU X.731 standard includes multiple attributes including Administrative State, Operational State and a list of other states. The Administrative State and Operational State are used to support maintenance of various objects. A user may be allowed to alter the Administrative State.

The TL1 interface standard derives its Secondary States from the Operational State Qualifiers. The TMF service state can also be derived from the Administrative State and the Operational State from the X.731 standard as well as the qualifiers from the TL-1 standard in the internal state model.

A state summary display may also be provided for showing the Administrative state, Service State and Alarm Inhibit State of each managed object to a user. A state detailed display may also be provided for showing a complete display of states to the user.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus and method are described for displaying multiple attributes relative to objects in a network management program. In one embodiment, multiple attributes from a plurality of different standards are coalesced together and the coalesced attributes are displayed by a user interface. These coalesced attributes may be shown in such a manner so that inconsistencies between attributes of objects from different standards are reduced or obviated.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different computing systems and devices. The embodiments of the present invention may be present in hardware, software or firmware. It is understood that one skilled in art may modify or change the data used in the examples described in the specification.

Reference in the specification to "one embodiment" or "an embodiment" means that a particular feature, characteristic, or function described in connection with the embodiment is included in at least one embodiment of the invention. The appearances of the phrase "in one embodiment" in various places in the specification are not necessarily all referring to the same embodiment.

A. Overview

Figure 1:
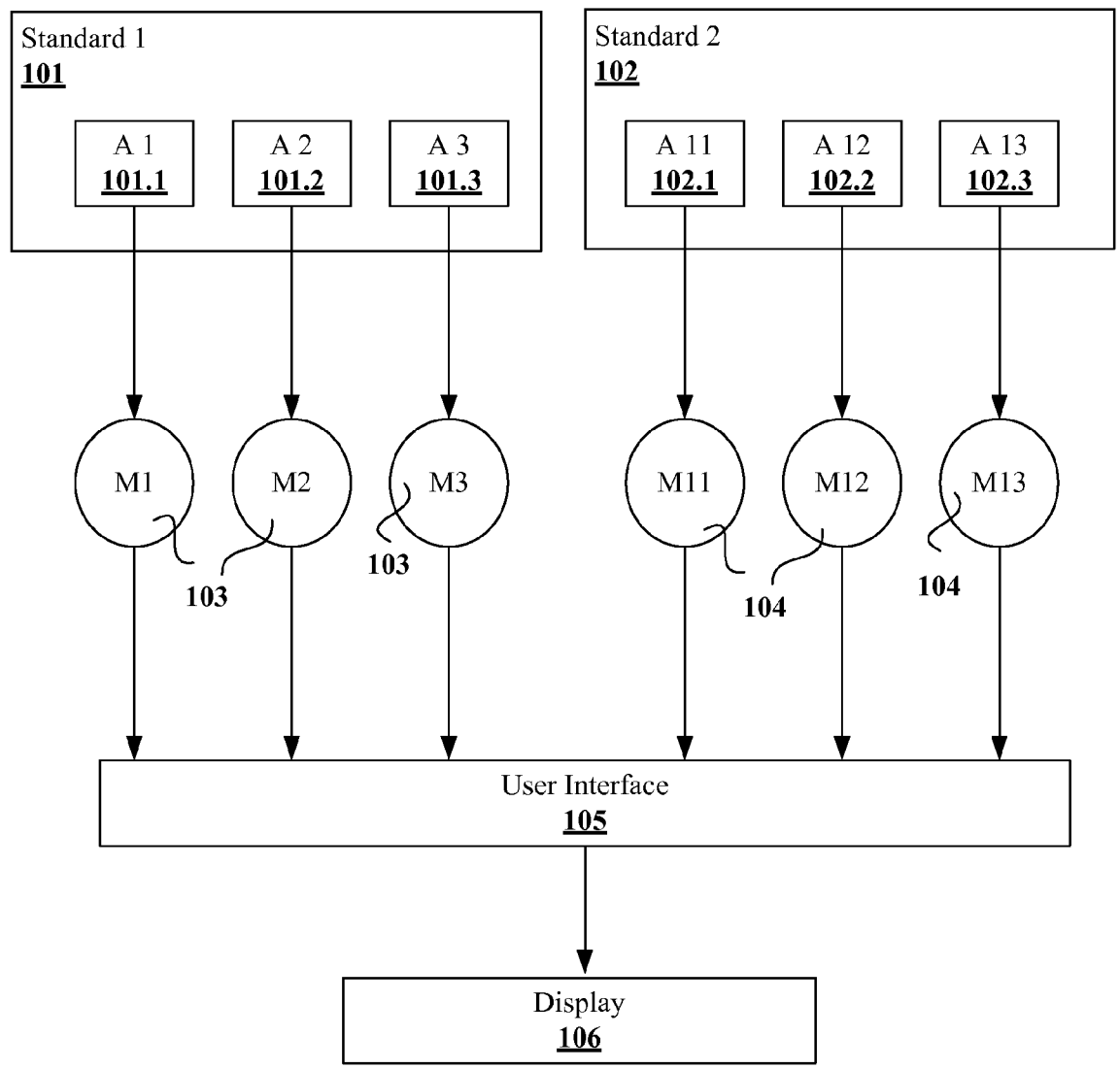
FIG. 1 illustrates a prior art approach for providing state model relating to each attribute.
Figure 2:
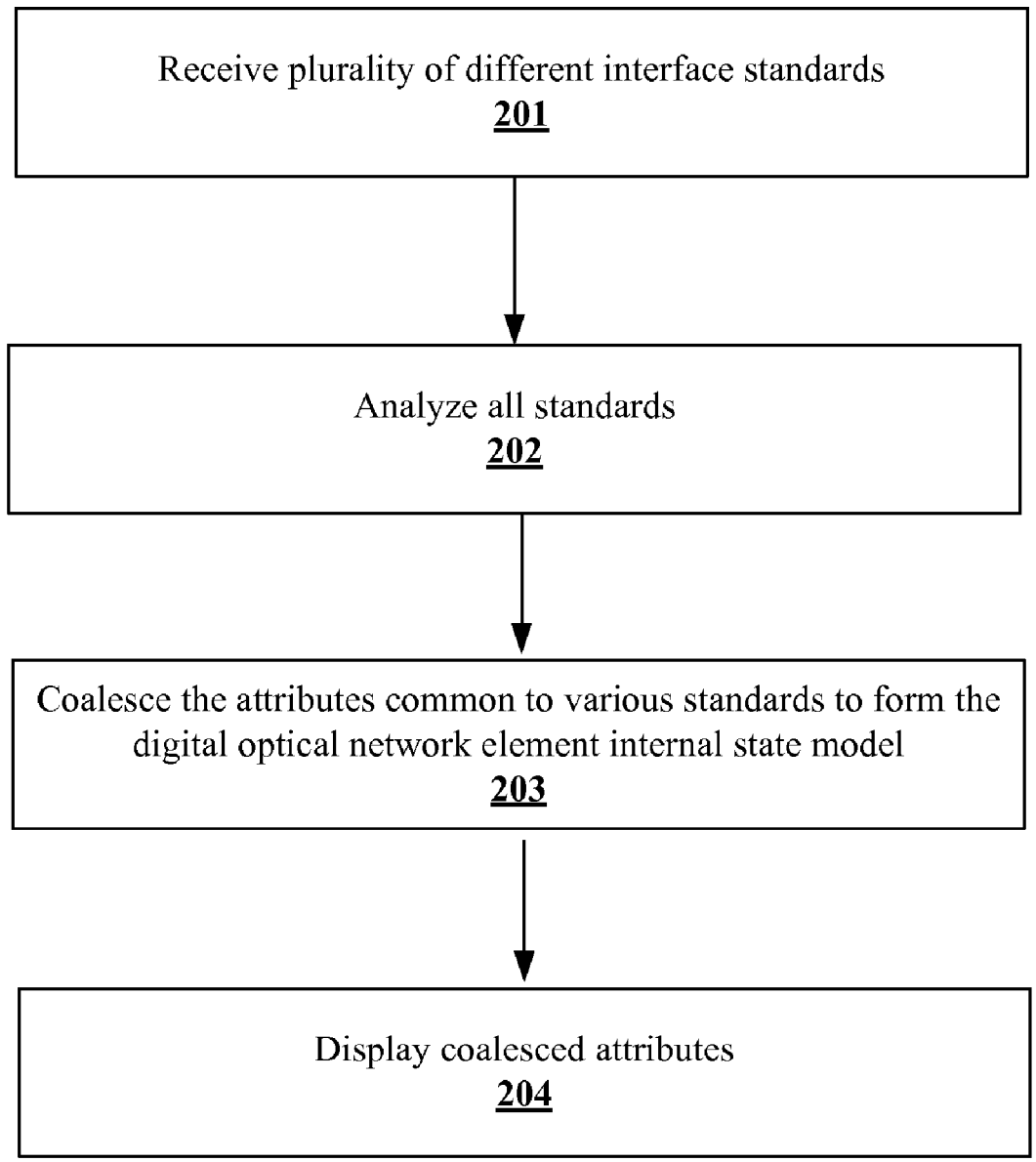
FIG. 2 illustrates the general method for displaying various attributes in coalesced form according to one embodiment the invention

FIG. 2 is a flowchart illustrating a general method for displaying various attributes in a coalesced form according to one embodiment the invention. The method may be initiated by taking into consideration various standards that are involved in the management of network elements employed in a digital optical network 201.

After receiving the different standards 201, each standard may be studied and analyzed 202 so as to identify the common attributes pertaining to the standards. Having identified the attributes common to various standards, a set of attributes may be defined 203. This set of attribute being common to all various standards, may be displayed 204 at the user's screen. The list of attributes may be analyzed considering the simplicity from the perspective of end-user display perspective. Several attributes may be coalesced to form a network element's internal state model. These coalesced attributes may also be displayed in order to prevent inconsistencies between attributes for different or similar objects from different standards.

For example, the TL1 interface standard requires a state model to follow the Bellcore GR1093 standard. Comparatively, proprietary software modules called Graphical Node Managers ("GNMs"), which display the nodes or network elements of a transmission network, and Element Management System ("EMS") programs for managing network elements in a transmission network, are oriented towards TMF 814 and ITU X.731 standards. The TMF standard is oriented toward communication between third party applications and the network management software. The internal state model of one embodiment of this invention provides a common and consistent basis to meet the requirements of the above-mentioned standards and coalesced attributes of these standards into a user friendly interface.

According to one embodiment of the invention, a secondary state required by the GR 1093 standard and a plurality of qualifier attributes required by the X.731 standard may be coalesced into an "Operational state qualifier" attribute. In other words, the TL1 interface standard may derive its secondary states from the Op-state qualifiers instead of displaying each X.731 qualifier status separately. As a result, a user is able to see them as a list of Op-state qualifiers.

The Administrative State and Operational state from X.731 standard may be retained in the internal information model and may also be enhanced to support some value-added features such as network maintenance. The TL1 interface standard uses these two states to derive Primary State and Primary State Qualifiers as required by GR 1093 standard. The TMF service state from the TL1 standard can also be derived from the Admin state from the X.731 standard, the operational state from the X.731 standard and the qualifiers from the GR1093 standard in the internal state model. Since a state is defined for each attribute, GNM and EMS have a base class for managing all objects containing various state attributes derived from different standards. The TMF Service state, which is purely intended for use with the GNM and EMS programs, is computed using the Admin state, Operational state and Op-state qualifier within this base class. This embodiment allows the entire GNM and EMS application to provide state related information consistently for all objects in accordance with these standards.

B. Coalesced Form of Standards

Figure 3:
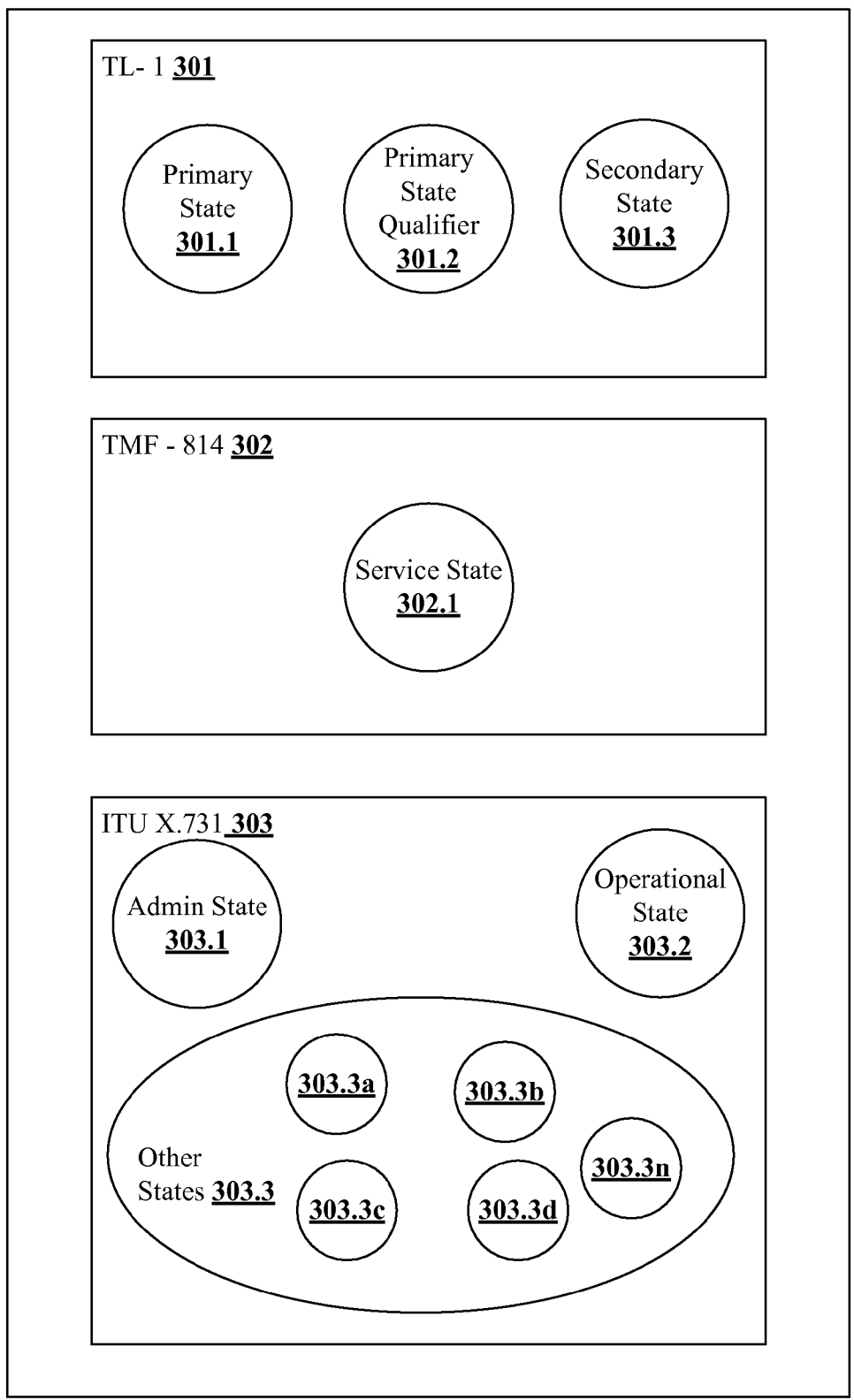
FIG. 3 shows general structure of the interface standards as per one embodiment of the present invention

FIG. 3 shows a general structure of the interface standards as per one embodiment of the present invention. In one embodiment of the invention, there are three predominant standards defined for states a network element, which are TL-1 301, TMF 814 302, and ITU X 731 303. As explained above, the TL1 interface standard 301 requires a state model to follow the Bellcore GR1093 standard and is primarily focused on user interface requirements. Comparatively, the ITU X.731 standard 302 is typically meant for modeling within a network element. Each of these standards has different attributes, such as TL-1 301 contains three attributes namely a Primary State 301.1, a Primary State Qualifier 301.2 and a Secondary State 301.3. These three states are combined together and provided to the users to control desired transitions between the several states. TMF 814 302 has one single attribute called the Service State 302.1 which requires four values (states) to be provided, one of which can be controlled by the end user. These states are provided below:

IN_SERVICE—means the entity has been put into operation and is operating as provisioned (completely or partially)

OUT_OF_SERVICE—means the entity is entirely not capable of performing its provisioned functions and is not restricted by administrative actions OUT_OF_SERVICE_BY_MAINTENANCE—means that the entity has been taken intentionally out of service by a management action SERV_NA—means that the service state is not applicable Finally, the ITU X.731 standard 303 has multiple attributes including an Administrative State (Admin State) 303.1 and an Operational State 303.2. The Admin State 303.1 is a read-write state and can be controlled by the end user, whereas the Operational State 303.2 is used to describe the inherent capability of an object. ITU X.731 303 also contains a group of other states 303.3 that qualify the Operational State 303.3 of an object.

C. Generic State Models

Figure 4:
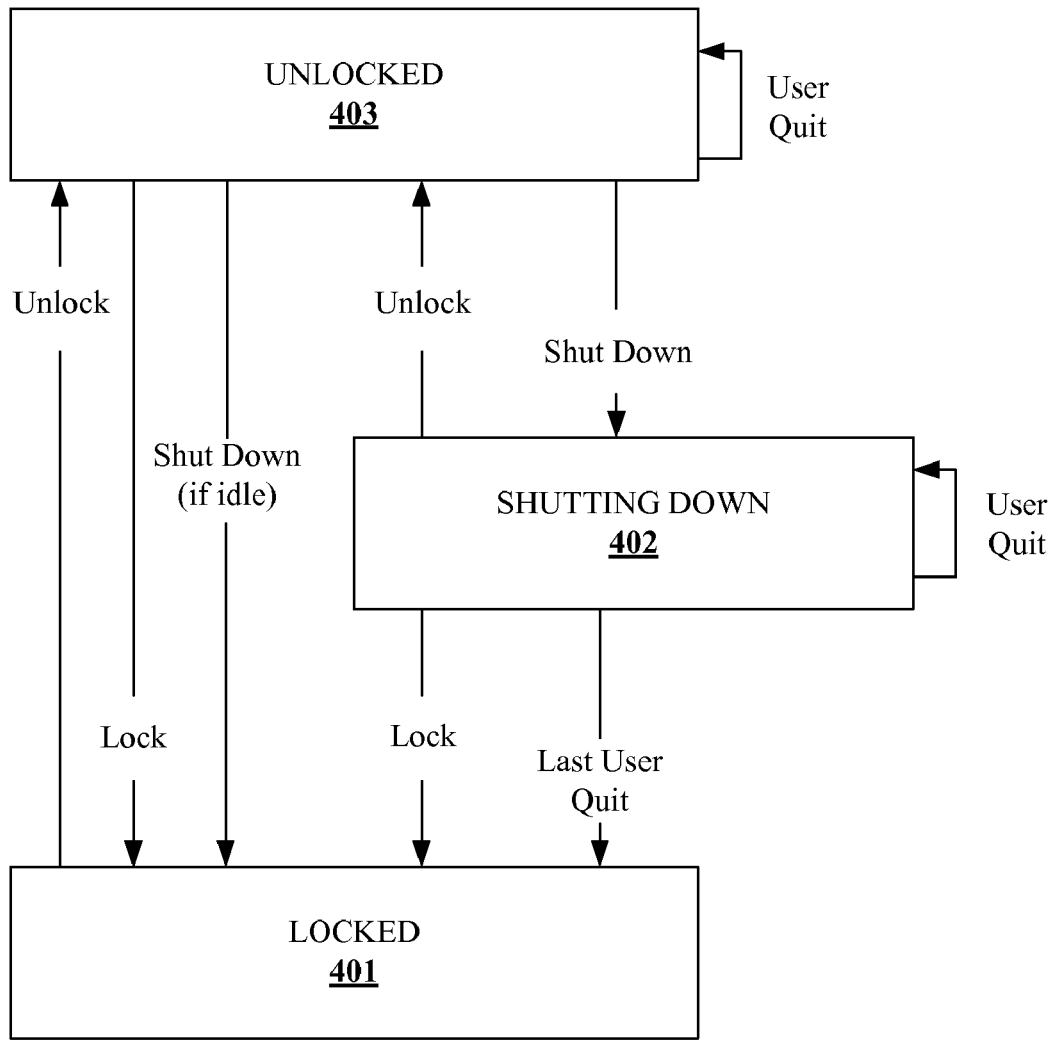
FIG. 4 shows an administrative state, which is a generic state taken from the X.731 standard according to one embodiment of the invention.

FIG. 4 shows an administrative state 400 which may be a single valued generic state taken from the X.731 standard. Specific events associated with a managed object may cause specific transitions from one administrative state value 400 to another, depending upon the original value of the administrative state 400, the specific event, and also upon the number of users of the resource. Exemplary events and transitions are summarized in FIG. 4, and are described below.

The administrative state 400 allows a user to do an operation, or does not allow or partially allows doing an operation. This state 400 can generally have one of the following values.

Locked 401: The locked event causes a transition to the locked administrative state. The resource may be administratively prohibited from performing services for its users. This event consists of an operation being performed at the managed object boundary to lock the managed object's corresponding resource. In one embodiment of the invention, this event can occur only if the managed object's administrative state is unlocked or shutting down.

Shutting Down 402: The shutting down event causes a state transition in two cases which are as follows:

(a) If, at the time of the event, the resource has existing users, the administrative state becomes shutting down.

(b) If, at the time of the event, the resource has no users, the administrative state becomes locked.

In one embodiment, the shutting down resource is administratively permitted to existing instances of use only. In other words, while the system remains in the shutting down state the manager may at any time cause the managed object to revert to the unlocked state. This event consists of an operation being performed at the managed object boundary to shut down the managed object's corresponding resource. In various embodiments, this event can occur only if the managed object's administrative state is unlocked.

Unlocked 403: The unlocked resource causes a transition to the unlocked administrative state. In one embodiment of the invention, the unlocked resource may be administratively permitted to perform services for its users. This event may be independent of its inherent operability. This event consists of an operation being performed at the managed object boundary to unlock the managed object's corresponding resource. In various embodiments, the event may occur only if the managed object's administrative state is locked or shutting down.

Figure 5:
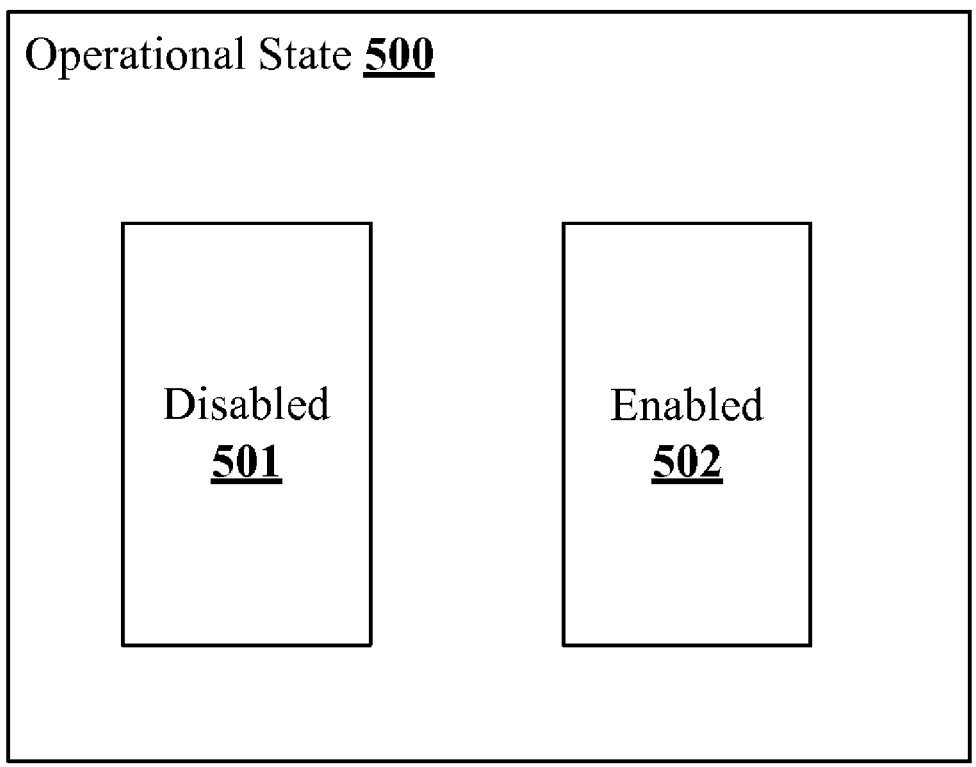
FIG. 5 shows an operational state, which is a generic state taken from the X.731 standard according to one embodiment of the invention.
Figure 6:
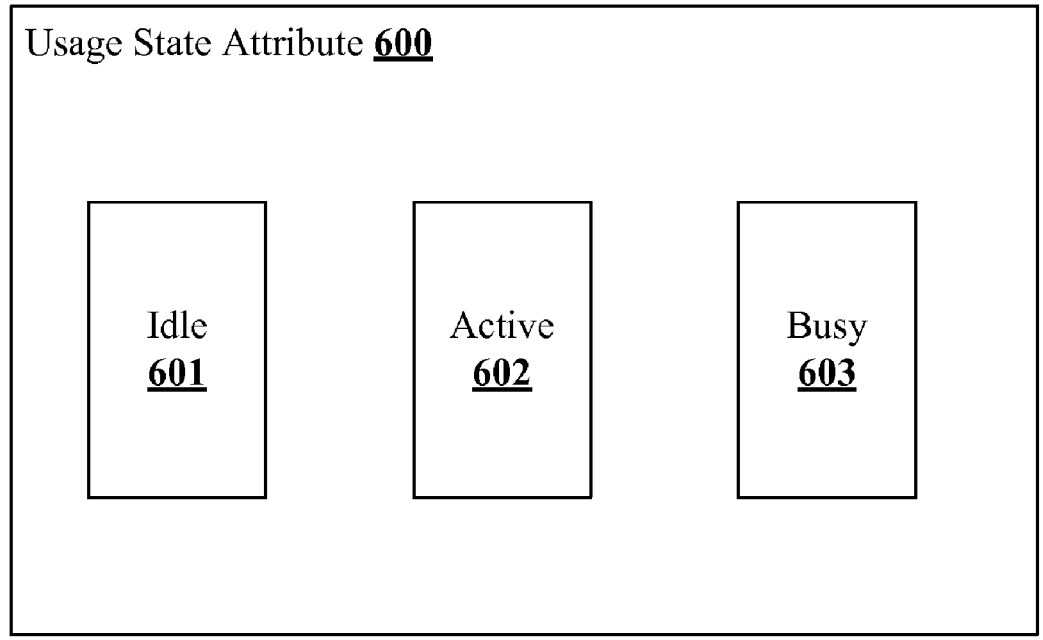
FIG. 6 shows a usage state attribute, which is a generic state taken from the X.731 standard according to one embodiment of the invention.

Similar to the Administrative state, FIG. 5 shows the contents of operational state 500 as per the ITU X.731 standard according to one embodiment of the invention. Operational state 500 is controlled by the object itself may also be a single valued generic state and may have one of the following values:

Disabled 501: The resource is totally inoperable and unable to provide service to the user(s).

Enabled 502: The resource is partially or fully operable and available for use.

A third value can also occur in the operational state that indicates that the object is partially enabled. One skilled in the art will recognize that other values within the operational state may be used and would fall within the scope of the present invention.

Similarly, another single-valued and read-only attribute, called as Usage State Attribute 600, may be used. An exemplary Usage State Attribute 600 having one of the following values is shown.

Idle 601: The resource is not currently in use.

Active 602: The resource is in use, and has sufficient spare operating capacity to provide for additional users simultaneously.

Busy 603: The resource is in use, but it has no spare operating capacity to provide for additional users at this instant.

D. State Transition Diagram

Figure 7:
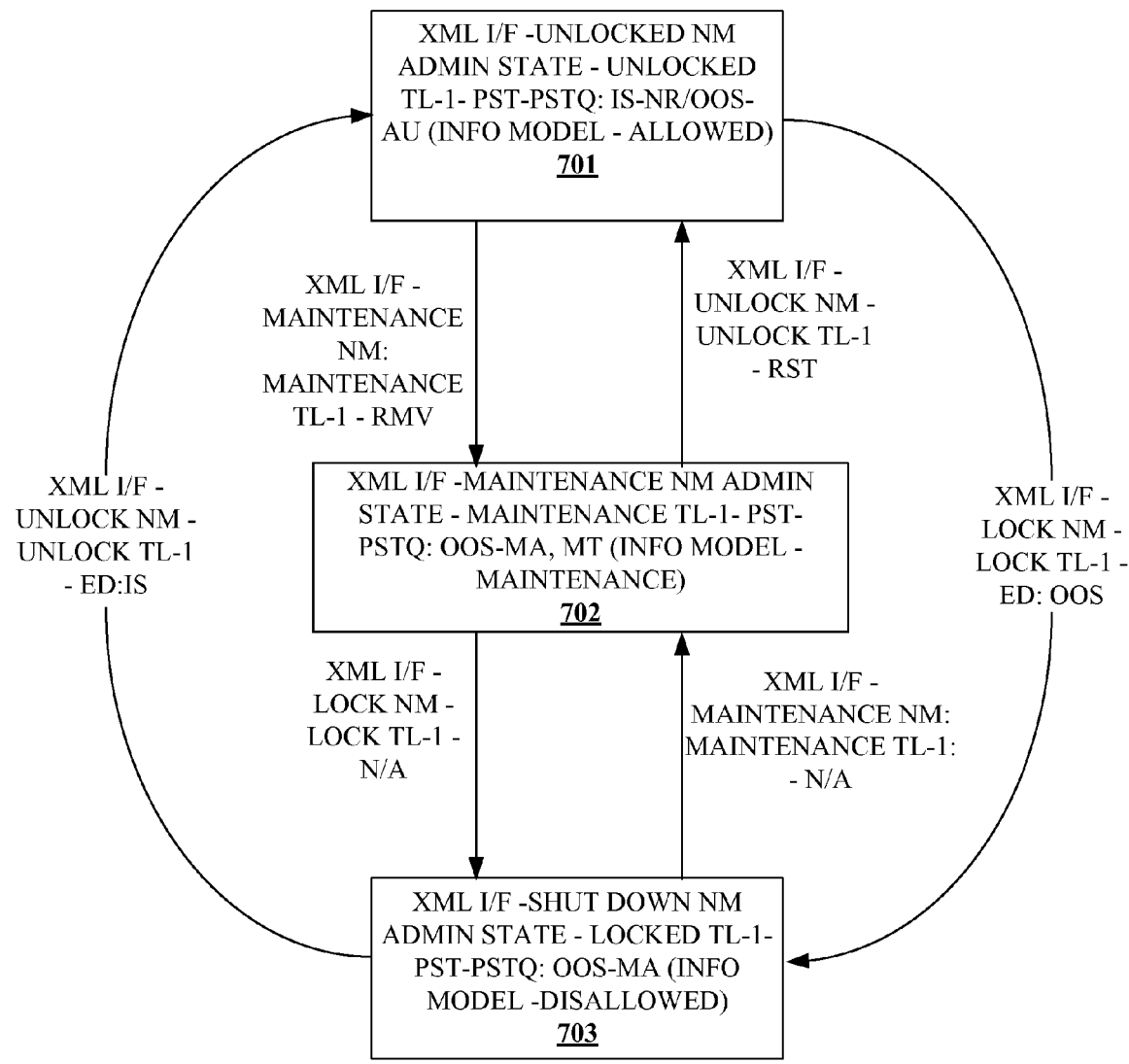
FIG. 7 shows a state model illustrating the Operational State maintenance state and Admin State as per one embodiment of the invention.

For explanation purposes, an exemplary state transition diagram is provided in FIG. 7. The generic ITU X.731 standard does not recommend a transition from a locked state to shutting down as per the ITU state diagram of FIG. 4. This transition is useful in cases where maintenance personnel would like to run diagnostics and then allow service to be provided. Further, ITU recommends that if all the existing users of a resource quit then the resource (which is in Shutting down state) transitions automatically to 'Locked' state.

According to one embodiment of the invention, a state transition between a locked state to a shutting down state is provided by a graphical node manager.

Unlocked (Unlock Action) 701—Administratively allowed to provide service as required.

Maintenance (Maintenance Action) 702—Allow existing service to continue but disallow any new service.

Locked (Lock Action) 703—Administratively disallowed to provide service.

In one embodiment of the present invention, a user may transition directly to the Allowed state 701 from a state of Disallowed 703. These transitions could be implemented on the network management presentation layer using current XML interfaces and implementations. The advantage of allowing all transitions in the XML format is that the XML interface remains capable of supporting different state models required by external OSS and is not restricted to the transitions imposed via the proprietary presentation layer.

The XML interface supports 'Enabled' and 'Disabled' as values of an operational state. The corresponding attribute (i.e. Service State) supports three state values of InService, NotInService, and Partial Service. The XML interface should also reflect all three supported state values for Operational State.

When an object is operationally disabled, it cannot have availability status of Available or Partially Available. When an object is operationally enabled, it cannot have availability status of unavailable. An Operational State Qualifier List is used to provide the secondary state combinations. It is a list item, which can contain combination of secondary states.

For consistency of display the graphical node manager and element management system programs may have the following capabilities. A state summary display in which the properties dialog for each managed object has a "state summary" section where the Admin state, Service State and Alarm inhibit state are displayed. This state summary may be consistently shown on the overall "summary" section of the properties dialog. In this state summary, a user is provided a quick view of the instantaneous state of the managed objects in these programs. In the detailed state display section, the properties dialogs may contain a "tab" where a more complete display of states is provided to the end user. This section also allows users to alter the Administrative state. To achieve the two displays, the graphical node manager and element management system programs have pre-defined state summary panel and state details panels. These two state panels may only require a base class instance to compute and display the relevant state information.

The foregoing description of the invention has been described for purposes of clarity and understanding. Although embodiments of the present invention have been described relative to a few standards, and associated attributes therein, one skilled in the art will recognize that the present invention is also very much applicable to other such standards. It is not intended to limit the invention to the precise form disclosed. Various modifications may be possible within the scope and equivalence of the appended claims.

We claim:

1. A method comprising:
identifying a plurality of standards;
identifying a state associated with a first one of the plurality of standards;
deriving, based on the identified state associated with the first one of the plurality of standards, a service state attribute associated with a second one of the plurality of standards; and
communicating the service state attribute to a user.

2. The method of claim 1 wherein the plurality of standards comprise at least two of TL-1, TMF 814 and ITU X.731 standards.

3. The method of claim 2 wherein the TL-1 standard comprises a primary state, a primary state qualifier, and a secondary state.

4. The method of claim 2 wherein the TMF 814 standard comprises the service state attribute.

5. The method of claim 4 wherein the state is selected from a group consisting of an administrative state, an operational state from the X.731 standard, and qualifiers from the TL-1 standard.

6. The method of claim 2 wherein the ITU X.731 standard comprises an administrative state and an operational state qualifier.

7. The method of claim 6 wherein the TL1 interface standard derives a plurality of secondary states from operational state qualifiers.

8. The method of claim 6 wherein the administrative state and operational state support maintenance of a plurality of objects.

9. The method of claim 1 wherein a state summary display is provided for showing an administrative state, a service state and an alarm inhibit state of a plurality of objects.

10. The method of claim 9 wherein a user is allowed to alter the administrative state.

11. The method of claim 1 wherein the communicating includes visually communicating the service state attribute to the user on a display.

12. A user interface apparatus for displaying a state model of a plurality of attributes relative to a plurality of standards, the apparatus comprising:
a first graphical display showing a first state of a first one of the plurality of attributes associated with a first one of the plurality of standards;
a second graphical display showing a second state of a second one of the plurality of attributes associated with a second one of the plurality of standards; and
wherein the first and second ones of the plurality of attributes are common to the first and second ones of the plurality of standards.

13. The user interface apparatus of claim 12 wherein the first one of the plurality of standards is a TL-1 standard and the second one of the plurality of standards is an ITU X.731 standard.

14. The user interface apparatus of claim 12 wherein the first and second graphical displays are shown on a state summary display.

15. The user interface apparatus of claim 12 further comprising a state summary display that shows the first and second ones of the plurality of attributes in at least one state selected from a group consisting of an administrative state, a service state and an alarm inhibit state.

16. The user interface apparatus of claim 12 further comprising a state display for showing states associated with the first and second ones of the plurality of attributes.

* * * * *